US012693608B2

(12) United States Patent
Kamai et al.

(10) Patent No.: US 12,693,608 B2
(45) Date of Patent: Jul. 28, 2026

(54) CARRIER CORE MATERIAL, AND ELECTROPHOTOGRAPHIC DEVELOPMENT CARRIER AND ELECTROPHOTOGRAPHIC DEVELOPER USING SAME

(71) Applicants: DOWA ELECTRONICS MATERIALS CO., LTD., Tokyo (JP); DOWA IP CREATION CO., LTD., Okayama (JP)

(72) Inventors: Yuto Kamai, Okayama (JP); Shinya Sasaki, Okayama (JP); Yuki Kaneshiro, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 1110 days.

(21) Appl. No.: 17/642,156

(22) PCT Filed: Sep. 14, 2020

(86) PCT No.: PCT/JP2020/034617
§ 371 (c)(1),
(2) Date: Jul. 12, 2022

(87) PCT Pub. No.: WO2021/060035
PCT Pub. Date: Apr. 1, 2021

(65) Prior Publication Data

US 2022/0390874 A1 Dec. 8, 2022

(30) Foreign Application Priority Data

Sep. 26, 2019 (JP) ................................ 2019-175203

(51) Int. Cl.
*G03G 9/107* (2006.01)

(52) U.S. Cl.
CPC ......... *G03G 9/1085* (2020.08); *G03G 9/1075* (2013.01)

(58) Field of Classification Search
CPC .......................... G03G 9/1085; G03G 9/1075
See application file for complete search history.

(56) References Cited

U.S. PATENT DOCUMENTS 5,595,850 A * 1/1997 Honjo ................. G03G 9/1085 252/62.63
5,976,747 A * 11/1999 Sato .................... G03G 9/1085 430/111.41

(Continued)

FOREIGN PATENT DOCUMENTS

EP 1 246 025 A1 10/2002
EP 1 612 612 A2 1/2006

(Continued)

OTHER PUBLICATIONS

JP-2005049495-A Translation (Year: 2025).*

(Continued)

*Primary Examiner* — Mark F. Huff
*Assistant Examiner* — Charles Collins Sullivan, IV
(74) *Attorney, Agent, or Firm* — Oliff PLC

(57) ABSTRACT

A carrier core material has a volume moment mean D [4, 3] of O. Bluntness measured with an injection type image analysis particle size distribution meter is equal to or greater than 65% and equal to or less than 80%, and the volume moment mean D [4, 3] of ISO Roundness is equal to or greater than 80% and equal to or less than 86%. In this way, it is possible to suppress development memory and carrier adherence.

5 Claims, 1 Drawing Sheet

(56) References Cited

U.S. PATENT DOCUMENTS

| | | | | |
|---|---|---|---|---|
| 2002/0177061 | A1 | 11/2002 | Kobayashi et al. | |
| 2005/0260516 | A1* | 11/2005 | Tomita ................. | G03G 9/0804 430/123.58 |
| 2011/0160104 | A1* | 6/2011 | Wu .......................... | C09K 8/80 507/269 |
| 2014/0242511 | A1 | 8/2014 | Kawauchi et al. | |
| 2014/0356781 | A1 | 12/2014 | Minagawa et al. | |
| 2017/0227866 | A1 | 8/2017 | Sugahara et al. | |
| 2019/0391506 | A1 | 12/2019 | Ogawa | |

FOREIGN PATENT DOCUMENTS

| | | | | |
|---|---|---|---|---|
| JP | H05333603 | A | * | 12/1993 |
| JP | 2002-357930 | A | | 12/2002 |
| JP | 2003280281 | A | * | 10/2003 |
| JP | 2004-333759 | A | | 11/2004 |
| JP | 2005049495 | A | * | 2/2005 |
| JP | 2005-164647 | A | | 6/2005 |
| JP | 2011-008199 | A | | 1/2011 |
| JP | 2013-137456 | A | | 7/2013 |
| JP | 2014-164061 | A | | 9/2014 |
| JP | 2015-007772 | A | | 1/2015 |
| JP | 2017-097252 | A | | 6/2017 |
| JP | 2017-142496 | A | | 8/2017 |
| JP | 2018-155827 | A | | 10/2018 |
| WO | 2018/180543 | A1 | | 10/2018 |

OTHER PUBLICATIONS

JP-H05333603-A Translation (Year: 2025).*

JP-2003280281-A Translation (Year: 2025).*

Occhio, Size & Shape Parameters definitions for Occhio products (Year: 2025).*

Aug. 28, 2023 Extended European Search Report issued in European Patent Application No. 20868254.2.

Nov. 24, 2020 Search Report issued in International Patent Application No. PCT/JP2020/034617.

* cited by examiner

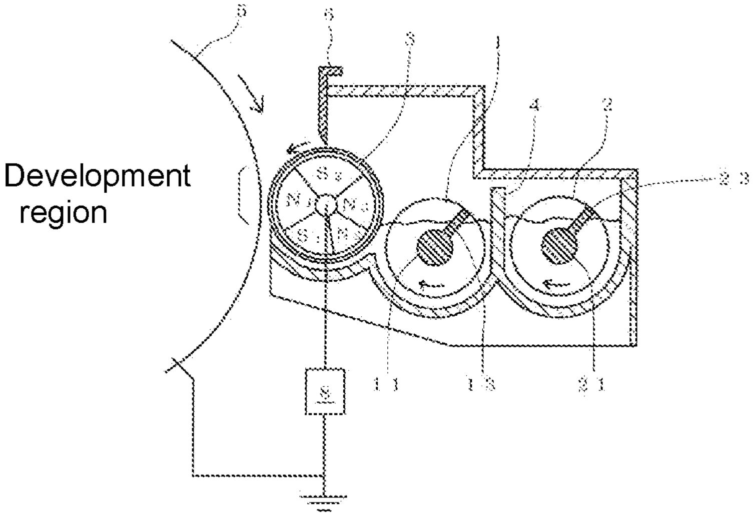
Development
region
5
6
3
1
4
2
23
11
13
21
8

CARRIER CORE MATERIAL, AND ELECTROPHOTOGRAPHIC DEVELOPMENT CARRIER AND ELECTROPHOTOGRAPHIC DEVELOPER USING SAME

TECHNICAL FIELD

The present invention relates to a carrier core material, and an electrophotographic development carrier and an electrophotographic developer which use such a carrier core material.

BACKGROUND ART

For example, in an image forming apparatus using an electrophotographic system, such as a facsimile, a printer or a copying machine, a toner is adhered to an electrostatic latent image formed on the surface of a photosensitive member to visualize it, the visualized image is transferred to a sheet or the like and thereafter it is fixed by being heated and pressurized. In terms of achieving high image quality and colorization, as a developer, a so-called two-component developer containing a carrier and a toner is widely used.

In a development system using a two-component developer, a carrier and a toner are agitated and mixed within a development device, and the toner is charged by friction so as to have a predetermined amount. Then, the developer is supplied to a rotating development roller, a magnetic brush is formed on the development roller and the toner is electrically moved to a photosensitive member through the magnetic brush to visualize an electrostatic latent image on the photosensitive member. The carrier after the movement of the toner is left on the development roller, and is mixed again with the toner within the development device. Hence, as the properties of the carrier, a magnetic property for forming the magnetic brush, a charging property for providing desired charge to the toner and durability in repeated use are required.

As the carrier described above, a carrier which is obtained by coating, with a resin, the surface of magnetic particles such as magnetite or various types of ferrites is generally used. In magnetic particles serving as a carrier core material, not only a satisfactory magnetic property but also a satisfactory friction charging property for the toner is required. As the carrier core material which satisfies the properties described above, carrier core materials having various shapes are proposed.

For example, in patent document 1, an electrophotographic development ferrite carrier core material is proposed which contains Sr (strontium) and has a specific shape and in which non-magnetic fine particles are adhered to the surface of particles and the inner surface of air holes. In patent document 2, a carrier core material is proposed in which a ratio between an infiltration pore volume value and a leaching pore volume value obtained by a mercury intrusion method falls within a predetermined range.

RELATED ART DOCUMENT

Patent Document

Patent Document 1: Japanese Unexamined Patent Application Publication No. 2013-137456

Patent Document 2: Japanese Unexamined Patent Application Publication No. 2011-8199

DISCLOSURE OF THE INVENTION

Problems to be Solved by the Invention

When a resin-coated carrier obtained by coating the surface of a carrier core material with a resin is mixed with a toner to form a two-component developer, a failure called "development memory" may occur in which an image density is lowered by the influence of an image on a development roller formed in the previous revolution. The development memory is estimated to be caused by the high electrical resistance of the resin-coated carrier, and, as one of measures therefor, it is considered that recesses and projections are provided in the surface of the carrier core material to expose part of the carrier core material to the surface of the resin-coated carrier and that thus the electrical resistance of the resin-coated carrier is lowered.

However, when the electrical resistance of the resin-coated carrier is lowered, "carrier adherence" may occur in which charge is injected into the resin-coated carrier in a development region to move the resin-coated carrier to a photosensitive drum.

Hence, an object of the present invention is to provide a carrier core material which can suppress not only the development memory but also the carrier adherence.

Another object of the present invention is to provide an electrophotographic development carrier and an electrophotographic developer which can stably form, even when used for a long period of time, an image of a satisfactory quality.

Means for Solving the Problem

In order to achieve the objects described above, a carrier core material according to the present invention is provided in which a volume moment mean D [4, 3] of O. Bluntness measured with an injection type image analysis particle size distribution meter is equal to or greater than 65% and equal to or less than 80%, and in which a volume moment mean D [4, 3] of ISO Roundness is equal to or greater than 80% and equal to or less than 86%.

In the present specification, the volume moment means D [4, 3] of O. Bluntness and ISO Roundness are values measured with a measurement device and measurement conditions below.

Measurement device: Injection type image analysis particle size distribution meter "IF-3200" made by JASCO Corporation Analysis software: PIA-Pro 14.18

Sample preparation conditions: 0.07 g of a sample was dispersed in a screw tube bottle (capacity 9 $cm^3$) into which 9 $cm^3$ of polyethylene glycol 400 was put and was thereafter measured.

Measurement Conditions:

Telecentric zoom lens with 2× magnification

Front lens with 2× magnification

Calibration value 0.417 μm/pixel

Spacer thickness 150 μm

Sampling 20%

Analysis type relative measurement

Measured amount 0.95 $cm^3$

Analysis dark detection

Threshold value 169 (fill holes)

O-Roughness filter 0.5

Filter Conditions at Time of Measurement:

ISO Area Diameter: Minimum 5, maximum 150, inner range

Analysis Filter Conditions:

ISO Area Diameter: Minimum 10, maximum 55, inner range

ISO Solidity: Minimum 0.9, maximum 1, inner range

O. Bluntness:

Index for smoothness of particle contour

Variation in the radii of all inscribed circles in a particle image

ISO Roundness: Index for particle roundness

Calculation formula of ISO Roundness:

$$(4 \times \text{Pixel Count})/(\pi \times ISO\ \text{Max distance}^2)$$

The carrier core material described above may include ferrite particles, and the composition of the ferrite particle may contain 35 mole percent or more and 55 mole percent or less of MnO and 45 mole percent or more and 65 mole percent or less of $Fe_2O_3$, and part thereof may be substituted for 0.1 mole percent or more and 1.0 mole percent or less of SrO and 0.1 mole percent or more and 1.0 mole percent or less of SnO.

In the carrier core material described above, a saturation magnetization $\sigma_s$ is preferably equal to or greater than 75 $Am^2/kg$ and equal to or less than 88 $Am^2/kg$.

In the carrier core material described above, a pore volume is preferably equal to or less than 0.01 $cm^3/g$.

According to the present invention, an electrophotographic development carrier is provided in which the surface of any one of the carrier core materials described above is coated with a resin.

Furthermore, according to the present invention, an electrophotographic developer is provided which includes the electrophotographic development carrier described above and a toner.

Advantages of the Invention

Even when the carrier core material according to the present invention is used in a high-speed image forming apparatus, it is possible to suppress the development memory and the carrier adherence.

A developer which includes the carrier core material according to the present invention is used, and thus it is possible to stably form, even when used for a long period of time, an image of a satisfactory quality.

BRIEF DESCRIPTION OF DRAWINGS

FIG. 1 is a schematic view showing an example of a development device which uses a carrier according to the present invention.

DESCRIPTION OF EMBODIMENTS

In order to obtain a carrier core material which can suppress the development memory and the carrier adherence, the present inventors have conducted thorough studies to find that the roundness of particles of the carrier core material and the smoothness of the surface of the particles (the contour of the particles) significantly affect the development memory and the carrier adherence, with the result that the present inventors have completed the present invention. Specifically, the major characteristic of the carrier core material according to the present invention is that the volume moment mean D [4, 3] of O. Bluntness is equal to or greater than 65% and equal to or less than 80%, and that the volume moment mean D [4, 3] of ISO Roundness is equal to or greater than 80% and equal to or less than 86%.

O. Bluntness serves as an index for the smoothness of the contour of the particles, and when the highest degree of smoothness is assumed to be "100%", as O. Bluntness is decreased from "100%", the contour of the particles is coarser. ISO Roundness serves as an index for the roundness of the particles, when the particles are spherical, ISO Roundness is assumed to be "100%" and as ISO Roundness is decreased from "100%", the particles are more irregular in shape. In the volume moment mean D [4, 3], the diameter of the particles which form most of the carrier core material is reflected, and the influences of bonded particles in which a plurality of particles are bonded and the like are excluded.

In a case where in the present invention, the volume moment mean D [4, 3] of O. Bluntness is less than 65%, when the carrier core material is coated with a resin and is used as a carrier, the carrier core material is excessively exposed to the surface of the carrier, and thus charge is easily injected into the carrier, with the result that the carrier adherence easily occurs. On the other hand, in a case where the volume moment mean D [4, 3] of O. Bluntness exceeds 80%, when the carrier core material is coated with a resin and is used as a carrier, the carrier core material is insufficiently exposed to the surface of the carrier, and thus counter charge accumulated in the carrier core material is unlikely to be discharged, with the result that the development memory easily occurs. The volume moment mean D [4, 3] of O. Bluntness preferably falls within a range equal to or greater than 70% and equal to or less than 75%.

When in the present invention, the volume moment mean D [4, 3] of ISO Roundness is less than 80%, the irregularity of the carrier in shape excessively proceeds, and thus the fluidity thereof cannot be ensured. On the other hand, when the volume moment mean D [4, 3] of ISO Roundness exceeds 86%, the irregularity of the carrier in shape is lowered, friction charging for the toner is unlikely to occur and thus the start-up characteristics of the charging of the toner within a developing machine are degraded, with the result that the development memory easily occurs.

Although the composition of the carrier core material in the present invention is not limited, the carrier core material preferably includes ferrite particles. When the carrier core material includes ferrite particles, the composition of the ferrite particles is used which is represented by a composition formula $M_XFe_{3-X}O_4$ (where M is at least one metal element selected from the group consisting of Mg, Mn, Ca, Ti, Sr, Cu, Zn, Sn and Ni and $0<X<1$). Among them, the composition of the ferrite particles is preferable which is represented by a general formula $(MnO)_a (Fe_2O_3)_b$ where a is equal to or greater than 35 mole percent and equal to or less than 55 mole percent and b is equal to or greater than 45 mole percent and equal to or less than 65 mole percent, and in which part of MnO is substituted for 0.1 mole percent or more and 1.0 mole percent or less of SrO and 0.1 mole percent or more and 1.0 mole percent or less of SnO.

The saturation magnetization $\sigma_s$ of the carrier core material according to the present invention preferably falls within a range equal to or greater than 75 $Am^2/kg$ and equal to or less than 88 $Am^2/kg$. The saturation magnetization $\sigma_s$ of the carrier core material falls within this range, and thus the occurrence of the carrier adherence in which the carrier is moved to a photosensitive drum is effectively suppressed.

The saturation magnetization $\sigma_s$ of the carrier core material more preferably falls within a range equal to or greater than 80 $Am^2/kg$ and equal to or less than 85 $Am^2/kg$. A magnetization $\sigma_{1k}$ when a magnetic field of $79.58\times10^3$ A/m (1000 oersted) is applied in the carrier core material of the present invention is preferably equal to or greater than 65 $Am^2/kg$ and equal to or less than 72 $Am^2/kg$.

The pore volume of the carrier core material in the present invention is preferably equal to or less than 0.01 $cm^3/g$. When the pore volume exceeds 0.01 $cm^3/g$, air gaps within the particles are increased in size, and thus the magnetization of one particle of the carrier core material is decreased, with the result that the carrier adherence easily occurs.

The volume average particle diameter (hereinafter also referred to as the "average particle diameter") of the carrier core material in the present invention preferably falls within a range equal to or greater than 25 μm and less than 50 μm, and more preferably falls within a range equal to or greater than 30 μm and equal to or less than 40 μm.

Although a method for manufacturing the carrier core material in the present invention is not particularly limited, a manufacturing method described below is preferable. In the present specification, "to" is used to mean that values mentioned before and after the "to" are included as the lower limit value and the upper limit value.

When the carrier core material includes the ferrite particles having the predetermined composition described above, predetermined amounts of Sn (tin) and Sr (strontium) are preferably contained. When Sr is contained, a Sr ferrite is partially generated in a calcination step, and a magnetoplumbite crystal structure is formed, with the result that a concave-convex shape in the surface of the carrier core material is easily facilitated and that irregularity in shape is easily facilitated. Sr and Sn are contained, and thus even when a calcination temperature is set equal to or greater than 1200° C. which is a conventional calcination temperature, spheronization caused by decomposition and melting of material components is suppressed, with the result that the concave-convex shape in the surface of the particles and the irregularity of the particles in shape are maintained and facilitated.

A Fe component raw material and an M component raw material (a Sr component raw material, a Sn component raw material and the like are included as necessary) are first weighed. As the Fe component raw material, $Fe_2O_3$ or the like is preferably used. When Mg is used, as the M component raw material, MgO, $Mg(OH)_2$ or $MgCO_3$ can be preferably used, and when Mn is used, $MnCO_3$, $Mn_3O_4$ or the like can be used. As a Ca component raw material, CaO, $Ca(OH)_2$, $CaCO_3$ or the like can be used, and when Ti is used, $TiO_2$ or the like can be used, and when Zr is used, $ZrO_2$ or the like can be used. As the Sn component raw material, $SnO_2$ or SnO can be used, and as the Sr component raw material, $SrCO_3$ $Sr(No_3)_2$ or the like is preferably used.

Then, the raw materials are put into a dispersion medium to produce slurry. As the dispersion medium used in the present invention, water is preferable. The pre-calcination raw materials described above and as necessary a binder, a dispersant and the like may be mixed into the dispersion medium. As the binder, for example, polyvinyl alcohol can be preferably used. As the amount of binder mixed, the concentration of the binder in the slurry is preferably set to about 0.1 to 2 mass %. As the dispersant, for example, polycarboxylic acid ammonium or the like can be preferably used. As the amount of dispersant mixed, the concentration of the dispersant in the slurry is preferably set to about 0.1 to 2 mass %. In addition, a reducing agent such as carbon black, a pH regulator such as ammonia, a lubricant, a sintering accelerator and the like may be mixed. The solid content concentration of the slurry preferably falls within a range of 50 to 90 mass %. The solid content concentration of the slurry more preferably falls within a range of 60 to 80 mass %. When the solid content concentration of the slurry is equal to or greater than 60 mass %, a small number of pores within the particles are produced in a granulated material, and thus it is possible to prevent insufficient sintering at the time of calcination.

After the weighed raw materials are mixed, pre-calcined and disintegrated, they may be put into the dispersion medium to produce slurry. A pre-calcination temperature preferably falls within a range of 750 to 1000° C. The pre-calcination temperature is preferably equal to or greater than 750° C. because the formation of part thereof into a ferrite caused by the pre-calcination proceeds, a small amount of gas is produced at the time of calcination and a reaction between solids sufficiently proceeds. On the other hand, the pre-calcination temperature is preferably equal to or less than 1000° C. because the degree of sintering caused by the pre-calcination is low, and thus the raw materials can be sufficiently milled in a slurry milling step which is thereafter performed. As an atmosphere at the time of pre-calcination, the atmosphere is preferable.

Then, the slurry produced as described above is wet-milled. For example, a ball mill or a vibration mill is used to perform wet-milling for a predetermined time. The average particle diameter of the milled raw materials is preferably equal to or less than 5 μm and is more preferably equal to or less than 1 μm. Within the vibration mill or the ball mill, a medium having a predetermined particle diameter is preferably provided. Examples of the material of the medium include an iron-based chromium steel and an oxide-based zirconia, titania, alumina and the like. As the form of the milling step, either of a continuous type and a batch type may be used. The particle diameter of the milled material is adjusted such as by a milling time, a rotation speed, the material and the particle diameter of the medium used.

Then, the milled slurry is granulated by being sprayed and dried. Specifically, the slurry is introduced into a spray drying machine such as a spray dryer, is sprayed into the atmosphere and is thereby granulated into a spherical shape. The temperature of the atmosphere at the time of the spray drying preferably falls within a range of 100 to 300° C. In this way, it is possible to obtain a spherical granulated material having a particle diameter of 10 to 200 μm. Then, as necessary, the granulated material which is obtained is classified with a vibration sieve, and thus the granulated material having a predetermined particle diameter range is produced.

Then, the granulated material described above is put into a furnace heated to a predetermined temperature, and is calcined by a general method for synthesizing ferrite particles, with the result that the ferrite particles are generated. The calcination temperature preferably falls within a range of 1100 to 1350° C. When the calcination temperature is equal to or less than 1100° C., phase transformation is unlikely to occur and sintering is also unlikely to proceed. When the calcination temperature exceeds 1350° C., excessive grains may be generated by excessive sintering. The rate of temperature increase to the calcination temperature preferably falls within a range of 250 to 500° C./h. A holding time at the calcination temperature is preferably equal to or greater than 2 hours. The recesses and projections in the surface of the ferrite particles can also be adjusted by an oxygen concentration in the calcination step. Specifically, the oxygen concentration is set to 0.05 to 10%. The oxidation state of a ferrite phase may be adjusted by lowering the oxygen concentration at the time of cooling with respect to the oxygen concentration at the time of calcination. Specifically, the oxygen concentration is set to fall within a range of 0.05 to 1.5%. The oxygen concentration in the temperature increase, the calcination and the cooling is preferably controlled to fall within a range of 0.05 to 10%.

The calcined material obtained as described above is disintegrated as necessary. Specifically, for example, a hammer mill or the like is used to disintegrate the calcined material. As the form of the disintegration step, either of a continuous type and a batch type may be used. Then, as necessary, classification may be performed after the disintegration processing such that the particle diameters are made to fall within a predetermined range. As a classification method, a conventional known method such as air classification or sieve classification can be used. After primary classification is performed with an air classifier, with a vibration sieve or an ultrasonic sieve, the particle diameters may be made to fall within the predetermined range. Furthermore, after the classification step, non-magnetic particles may be removed with a magnetic field concentrator. The particle diameter of the ferrite particles preferably falls within a range equal to or greater than 25 μm and less than 50 μm.

Thereafter, as necessary, the ferrite particles after the classification are heated in an oxidizing atmosphere, and thus an oxide film is formed on the surface of the particles, with the result that the resistance of the ferrite particles may be increased (resistance increasing processing). As the oxidizing atmosphere, either of the atmosphere and the mixed atmosphere of oxygen and nitrogen may be used. The heating temperature preferably falls within a range equal to or greater than 200° C. and equal to or less than 800° C., and more preferably falls within a range equal to or greater than 360° C. and equal to or less than 550° C. The heating time preferably falls within a range equal to or greater than 0.5 hours and equal to or less than 5 hours. In terms of homogenizing the surface and interior of the ferrite particles, the heating temperature is preferably a low temperature.

The ferrite particles produced as described above are used as the carrier core material of the present invention. In order to obtain desired chargeability and the like, an electrophotographic development carrier is obtained by coating the circumference of the carrier core material with a resin.

As the resin with which the surface of the carrier core material is coated, a conventional known resin can be used. Examples thereof include polyethylene, polypropylene, polyvinyl chloride, poly-4-methylpentene-1, polyvinylidene chloride, ABS (acrylonitrile-butadiene-styrene) resin, polystyrene, (meth) acrylic-based resin, polyvinyl alcohol-based resin, thermoplastic elastomers such as polyvinyl chloride-based, polyurethane-based, polyester-based, polyamide-based and polybutadiene-based thermoplastic elastomers, fluorine silicone-based resins and the like.

In order to coat the surface of the carrier core material with the resin, a solution or dispersion solution of the resin is preferably applied to the carrier core material. As a solvent for the coating solution, one or two or more types of the followings can be used: aromatic hydrocarbon-based solvents such as toluene and xylene; ketone-based solvents such as acetone, methyl ethyl ketone, methyl isobutyl ketone and cyclohexanone; cyclic ether-based solvents such as tetrahydrofuran and dioxane; alcohol-based solvents such as ethanol, propanol and butanol; cellosolve-based solvents such as ethyl cellosolve and butyl cellosolve; ester-based solvents such as ethyl acetate and butyl acetate; amide-based solvents such as dimethyl formamide and dimethylacetamide; and the like. The concentration of the resin component in the coating solution generally falls within a range equal to or greater than 0.001 mass % and equal to or less than 30 mass %, and particularly preferably falls within a range equal to or greater than 0.001 mass % and equal to or less than 2 mass %.

As a method for coating the carrier core material with the resin, for example, a spray dry method, a fluidized bed method, a spray dry method using a fluidized bed, a dipping method or the like can be used. Among them, the fluidized bed method is particularly preferable because it is possible to efficiently perform coating with a small amount of resin. For example, in the case of the fluidized bed method, the amount of resin applied can be adjusted by the amount of resin solution sprayed and a spraying time.

With respect to the particle diameter of the carrier, its volume average particle diameter generally falls within a range equal to or greater than 25 μm and less than 50 μm, and particularly preferably falls within a range equal to or greater than 30 μm and equal to or less than 40 μm.

The electrophotographic developer according to the present invention is formed by mixing the carrier produced as described above and the toner. The mixing ratio between the carrier and the toner is not particularly limited, and is preferably determined, as necessary, from the development conditions of a development device used or the like. In general, the concentration of the toner in the developer preferably falls within a range equal to or greater than 1 mass % and equal to or less than 15 mass %. This is because when the concentration of the toner is less than 1 mass %, an image density is excessively lowered whereas when the concentration of the toner exceeds 15 mass %, the toner is scattered within the development device, and thus a stain within an apparatus may be produced or a failure may occur in which the toner is adhered to a background part of transfer paper or the like. The concentration of the toner more preferably falls within a range equal to or greater than 3 mass % and equal to or less than 10 mass %.

As the toner, a toner can be used which is manufactured by a conventional known method such as a polymerization method, a milling/classification method, a melting granulation method or a spray granulation method. Specifically, a toner can be preferably used in which a coloring agent, a mold release agent, a charge control agent and the like are contained in a binder resin whose main component is a thermoplastic resin.

With respect to the particle diameter of the toner, in general, its volume average particle diameter measured with a coulter counter preferably falls within a range equal to or greater than 5 μm and equal to or less than 15 μm, and more preferably falls within a range equal to or greater than 7 μm and equal to or less than 12 μm.

A modifier may be added to the surface of the toner as necessary. Examples of the modifier include silica, alumina, zinc oxide, titanium oxide, magnesium oxide, polymethyl methacrylate and the like. One or two or more types thereof can be combined and used.

The mixing of the carrier and the toner can be performed with a conventional known mixing device. For example, a Henschel mixer, a V-type mixer, a tumbler mixer, a hybridizer and the like can be used.

Although a development method using the developer of the present invention is not particularly limited, a magnetic brush development method is preferably used. FIG. 1 is a schematic view showing an example of a development device which performs magnetic brush development. The development device shown in FIG. 1 includes: a development roller 3 which incorporates a plurality of magnetic poles and is freely rotatable; a regulation blade 6 which regulates the amount of developer on the development roller 3 transported to a development portion; two screws 1 and 2 which are arranged parallel to a horizontal direction and respectively agitate and transport the developer in opposite directions; and a partition plate 4 which is formed between the two screws 1 and 2, which makes it possible to move the developer from one screw to the other screw at both end portions of the screws and which prevents the movement of the developer in the portions other than both the end portions.

In the two screws 1 and 2, spiral blades 13 and 23 are formed at the same inclination angles on shaft portions 11 and 21 and are rotated by an unillustrated drive mechanism in the same direction so as to respectively transport the developer in the opposite directions. At both the end portions of the screws 1 and 2, the developer is moved from one screw to the other screw. In this way, the developer formed of the toner and the carrier is constantly circulated and agitated within the device.

On the other hand, the development roller 3 includes a fixed magnet where within a metallic cylindrical member having concave and convex portions of a few micrometers in its surface, as a magnetic pole generating means, five magnetic poles of a development magnetic pole $N_1$, a transport magnetic pole $S_1$, a separation magnetic pole $N_2$, a pumping magnetic pole $N_3$ and a blade magnetic pole $S_2$ are sequentially arranged. When the development roller 3 is rotated in a direction indicated by an arrow, the developer is pumped up by the magnetic force of the pumping magnetic pole $N_3$ from the screw 1 to the development roller 3. The developer carried on the surface of the development roller 3 is regulated in layer by the regulation blade 6 and is thereafter transported to the development region.

In the development region, a bias voltage obtained by superimposing an alternating-current voltage on a direct-current voltage is applied from a transfer voltage power supply 8 to the development roller 3. The direct-current voltage component of the bias voltage is set to a potential between the potential of a background portion and the potential of an image portion on the surface of a photosensitive drum 5. The potential of the background portion and the potential of the image portion are set to potentials between the maximum value and the minimum value of the bias voltage. The peak-to-peak voltage of the bias voltage preferably falls within a range of 0.5 to 5 kV, and the frequency preferably falls within a range of 1 to 10 kHz. The waveform of the bias voltage may be any waveform such as a rectangular wave, a sine wave or a triangular wave. In this way, the toner and the carrier are vibrated in the development region, the toner is adhered to an electrostatic latent image on the photosensitive drum 5 and thus the development is performed.

Thereafter, the developer on the development roller 3 is transported by the transport magnetic pole $S_1$ into the device, is separated by the separation magnetic pole $N_2$ from the development roller 3, is circulated and transported again by the screws 1 and 2 within the device and is agitated and mixed with the developer which is not subjected to the development. Then, the developer is newly supplied by the pumping magnetic pole $N_3$ from the screw 1 to the development roller 3.

Although in the embodiment shown in FIG. 1, the number of magnetic poles incorporated in the development roller 3 is five, the number of magnetic poles may naturally be increased to 8, 10 or 12 so that the amount of movement of the developer in the development region is further increased or that the pumping property or the like is further enhanced.

EXAMPLES

Example 1

A carrier core material was produced by the following method. $Fe_2O_3$, $SnO_2$, $SrCO_3$ and $Mn_3O_4$ were dispersed in water so as to achieve a ratio between 11.1 moles of Fe, 0.05 moles of Sn, 0.04 moles of Sr and 4.4 moles of Mn, as a dispersant, 0.600 wt % of an ammonium polycarboxylate-based dispersant was added and as a reducing agent, 0.300 wt % of carbon black was added. The solid content concentration of this mixture was 75 wt %.

The mixture was subjected to milling processing with a wet ball mill (medium diameter of 2 mm), and thus mixed slurry was obtained. The mixed slurry was sprayed with a spray drier into hot air of about 210° C., and thus a dried granulated material having a particle diameter of 10 to 75 μm was obtained. Coarse particles were separated from the granulated material with a sieve whose mesh was 50×54 μm, and fine particles were separated with a sieve whose mesh was 25×32 μm.

The granulated material was put into an electric furnace, and the temperature thereof was increased to 1230° C. in 5 hours. Thereafter, the granulated material was held at 1230° C. for 3 hours, and thus calcination was performed. Then, the granulated material was cooled to 500° C. at a cooling rate of 2° C./minute. A gas obtained by mixing oxygen and nitrogen was supplied into the furnace such that the concentration of oxygen within the electric furnace in a temperature increasing step and a step of holding a calcination temperature was 15000 ppm and that the concentration of oxygen in a cooling step was 4000 ppm.

The calcined material obtained was disintegrated with a hammer mill and was thereafter classified with a vibration sieve, and thus the calcined material whose average particle diameter was 34.6 μm was obtained.

Then, the calcined material obtained was held under the atmosphere at 410° C. for 1.5 hours, and thus oxidation processing (resistance increasing processing) was performed, with the result that the carrier core material was obtained.

The composition, the shape property, the powder property, the magnetic property, the electrical property and the like of the obtained carrier core material were measured by methods described later. The results of the measurements are shown in tables 1 and 2.

Then, a carrier was produced by coating, with a resin, the surface of the carrier core material obtained as described above. Specifically, 450 mass parts of silicone resin and 9 mass parts of (2-aminoethyl) aminopropyl trimethoxysilane were dissolved in 450 mass parts of toluene serving as a solvent, and thus a coat solution was produced. The coat solution was applied with a fluidized bed-type coating device to 50000 mass parts of the carrier core material and was heated with the electric furnace whose temperature was 300° C., and thus the carrier was obtained. Likewise, in all examples and comparative examples which will be described below, the carrier was obtained.

The obtained carrier and a toner whose average particle diameter was about 5.0 μm were mixed with a pot mill for a predetermined time, and thus a two-component electrophotographic developer was obtained. In this case, the carrier and the toner were adjusted such that mass of the toner/(masses of the toner and the carrier)=5/100. Likewise, in all examples and comparative examples which will be described below, the developer was obtained. On the obtained developer, evaluations using an actual device which will be described later were performed. The results of the evaluations are shown in table 2.

Example 2

A carrier core material having an average particle diameter of 34.8 μm was produced by the same method as in example 1 except that the temperature of the electric furnace in a calcination step was changed to 1275° C. and that the concentration of oxygen within the electric furnace in the temperature increasing step and the step of holding the calcination temperature was changed to 4000 ppm.

Example 3

A carrier core material having an average particle diameter of 34.5 μm was produced by the same method as in example 1 except that the temperature of the electric furnace in the calcination step was changed to 1300° C.

Example 4

A carrier core material having an average particle diameter of 35.0 μm was produced by the same method as in example 3 except that, when the material was granulated, coarse particles were separated with a sieve whose mesh was 48 μm and fine particles were separated with a sieve whose mesh was 37 μm.

Example 5

A carrier core material having an average particle diameter of 36.6 μm was produced by the same method as in example 1 except that $Fe_2O_3$, $SnO_2$, $SrCO_3$ and $Mn_3O_4$ were dispersed in water so as to achieve a ratio between 10.0 moles of Fe, 0.05 moles of Sn, 0.04 moles of Sr and 5.0 moles of Mn, that, when the material was granulated, coarse particles were separated with a sieve whose mesh was 48 μm and fine particles were separated with a sieve whose mesh was 37 μm and that the temperature of the electric furnace in the calcination step was changed to 1315° C.

Comparative Example 1

A carrier core material having an average particle diameter of 34.4 μm was produced by the same method as in example 1 except that Sn and Sr were not added, that the temperature of the electric furnace in the calcination step was changed to 1200° C., that the concentration of oxygen within the electric furnace in the temperature increasing step and the step of holding the calcination temperature was changed to 5000 ppm and that the concentration of oxygen in the cooling step was 10000 ppm.

Comparative Example 2

$Fe_2O_3$, $SrCO_3$ and $Mn_3O_4$ were dispersed in water so as to achieve a ratio between 10.0 mole percent of Fe, 0.08 mole percent of Sr and 5.0 mole percent of Mn, as a dispersant, 0.600 wt % of an ammonium polycarboxylate-based dispersant was added, as a reducing agent, 0.300 wt % of carbon black was added and 0.177 wt % of 36.5% concentrated hydrochloric acid was added. The solid content concentration of this mixture was 75 wt %.

The mixture was subjected to milling processing with the wet ball mill (medium diameter of 2 mm), and thus mixed slurry was obtained. The mixed slurry was sprayed with a spray drier into hot air of about 210° C., and thus a dried granulated material having a particle diameter of 10 to 75 μm was obtained. Coarse particles were separated from the granulated material with a sieve whose mesh was 50×54 μm, and fine particles were separated with a sieve whose mesh was 33 μm.

The granulated material was put into the electric furnace, the temperature thereof was increased to 900° C. in 3 hours and was thereafter held at 900° C. for 5.5 hours, and thus calcination was performed. At that time, the concentration of oxygen within the electric furnace was 210000 ppm. The calcined material which was thereafter generated was continuously put into the electric furnace, and the temperature thereof was increased to 1165° C. in 5 hours. The temperature was thereafter held at 1165° C. for 3 hours, and thus calcination was performed. Then, the temperature was cooled to 500° C. at a cooling rate of 2° C./minute. A gas obtained by mixing oxygen and nitrogen was supplied into the furnace such that the concentration of oxygen within the electric furnace in the temperature increasing step, the step of holding the calcination temperature and the cooling step was constant to be 7000 ppm.

The calcined material obtained was disintegrated with the hammer mill and was thereafter classified with the vibration sieve, and thus a carrier core material whose average particle diameter was 36.2 μm was obtained.

Comparative Example 3

$Fe_2O_3$, $Mg(OH)_2$, $SrCO_3$ and $Mn_3O_4$ were weighed so as to achieve a ratio between 10.0 mole percent of Fe, 1.1 mole percent of Mg, 0.08 mole percent of Sr and 3.80 mole percent of Mn, they were milled with a dry media mill (vibration mill, ⅛ inch diameter stainless steel beads) for 10 hours, the milled material obtained was heated in the electric furnace at 1200° C. for 3 hours and thus pre-calcination was performed. Then, the resulting material was milled with the dry media mill (vibration mill, ⅛ inch diameter stainless steel beads) for 10 hours such that the average particle diameter was about 5 μm, water was added and the resulting material was further milled with the wet ball mill (medium diameter of 2 mm) for 10 hours. The average particle diameter of this slurry was about 2.3 μm. An appropriate amount of dispersant was added to the slurry, 0.4 mass % of PVA (10% solution) with respect to the solid content was added as a binder and thus mixed slurry was obtained. The mixed slurry was sprayed with a spray drier into hot air of about 210° C., and thus a dried granulated material having a particle diameter of 10 to 75 μm was obtained. Coarse particles were separated from the granulated material with a sieve whose mesh was 50×54 μm, and fine particles were separated with a sieve whose mesh was 33 μm. Thereafter, a rotary electric furnace was used to heat the resulting granulated material under the atmosphere at 750° C. for 2 hours, and thus organic components such as the dispersant and the binder were removed.

The granulated material was put into the electric furnace, and the temperature thereof was increased to 1300° C. in 5 hours. The temperature was thereafter held at 1300° C. for 3 hours, and thus calcination was performed. Then, the temperature was cooled to 500° C. at a cooling rate of 2° C./minute. A gas obtained by mixing oxygen and nitrogen was supplied into the furnace such that the concentration of oxygen within the electric furnace in the temperature increasing step, the step of holding the calcination temperature and the cooling step was constant to be 7000 ppm.

The calcined material obtained was disintegrated with the hammer mill and was thereafter classified with the vibration sieve, and thus a carrier core material whose average particle diameter was 36.9 μm was obtained.

Comparative Example 4

A carrier core material having an average particle diameter of 36.6 μm was produced by the same method as in example 5 except that the temperature of the electric furnace in the calcination step was changed to 1275° C.

(Composition Analysis)

(Analysis of Fe)

The carrier core material containing iron element was weighed and dissolved in mixed acid water of hydrochloric acid and nitric acid. This solution was evaporated to dryness and was thereafter dissolved again by adding sulfuric acid water thereto, and thus excessive hydrochloric acid and nitric acid were volatilized. Solid aluminum was added to this solution, and thus all $Fe^{3+}$ ions in the liquid were reduced to $Fe^{2+}$ ions. Then, the amount of $Fe^{2+}$ irons in this solution was subjected to potentiometric titration using a potassium permanganate solution, and thus quantitative analysis was performed, with the result that the titer of Fe ($Fe^{2+}$) was determined.

(Analysis of Mn)

For the content of Mn in the carrier core material, quantitative analysis was performed according to a ferromanganese analysis method (potentiometric titration method) described in JIS G 1311-1987. The content of Mn in the carrier core material described in the invention of the present application is the amount of Mn which was obtained by performing the quantitative analysis with the ferromanganese analysis method (potentiometric titration method).

(Analysis of Mg)

The content of Mg in the carrier core material was analyzed by the following method. The carrier core material according to the invention of the present application was dissolved in an acid solution, and quantitative analysis was performed by ICP. The content of Mg in the carrier core material described in the invention of the present application is the amount of Mg which was obtained by performing the quantitative analysis with ICP.

(Analysis of Sn)

The content of Sn in the carrier core material was determined by quantitative analysis with ICP as in the analysis of Mg.

(Analysis of Sr)

The content of Sr in the carrier core material was determined by quantitative analysis with ICP as in the analysis of Mg.

(Measurements of volume moment means D [4, 3] of O. Bluntness and ISO Roundness)

Measurements were performed with a measurement device and measurement conditions below.

Measurement device: Injection type image analysis particle size distribution meter "IF-3200" made by JASCO Corporation Analysis software: PIA-Pro 14.18

Sample preparation conditions: 0.07 g of a sample was dispersed in a screw tube bottle (capacity 9 $cm^3$) into which 9 $cm^3$ of polyethylene glycol 400 was put and was thereafter measured.

Measurement Conditions:

Telecentric zoom lens with 2× magnification

Front lens with 2× magnification

Calibration value 0.417 μm/pixel

Spacer thickness 150 μm

Sampling 20%

Analysis type relative measurement

Measured amount 0.95 $cm^3$

Analysis dark detection

Threshold value 169 (fill holes)

O-Roughness filter 0.5

Filter Conditions at Time of Measurement:

ISO Area Diameter: Minimum 5, maximum 150, inner range

Analysis Filter Conditions:

ISO Area Diameter: Minimum 10, maximum 55, inner range

ISO Solidity: Minimum 0.9, maximum 1, inner range

O. Bluntness:

Index for smoothness of particle contour

Variation in the radii of all inscribed circles in a particle image ISO Roundness: Index for particle roundness Calculation Formula of ISO Roundness:

$$(4\times\text{Pixel Count})/(\pi\times ISO\text{ Max distance}^2)$$

(Apparent Density AD)

The apparent density of the carrier core material was measured according to JIS Z 2504.

(Fluidity FR)

The fluidity of the carrier core material was measured according to JIS Z 2502.

(Volume Average Particle Diameter $D_{50}$ and Percentage of Particles Having Particle Diameter of 26 μm or Less)

The volume average particle diameter $D_{50}$ of the carrier core material and the percentage of the number of particles having a particle diameter of 26 μm or less were measured with a laser diffraction type particle size distribution measuring device ("Microtrac Model 9320-X100" made by Nikkiso Co., Ltd.).

(Pore Volume)

A pore volume was measured as follows. As an evaluation device, POREMASTER-60GT made by Quantachrome Instruments was used. Specifically, measurement conditions were Cell stem volume: 0.5 $cm^3$, Head pressure: 20 PSIA, Surface tension of mercury: 485.00 $erg/cm^2$, Contact angle of mercury: 130.00 degrees, High voltage measurement mode: fixed rate, Motor speed: 1 and High pressure measurement range: 20.00 to 10000.00 PSI, 1.200 g of a sample was weighed and filled into a cell of 0.5 $cm^3$ and the measurement was performed. A value obtained by subtracting a volume A ($cm^3/g$) at 100 PSI from a volume B ($cm^3/g$) at 10000.00 PSI was used as the pore volume.

(Internal Porosity)

The carrier core material was dispersed in a resin and was subjected to vacuum defoaming processing such that the resin was filled into the carrier core material, was thereafter applied to an auxiliary plate and was subjected to thermal processing at a temperature of 200° C. for 20 minutes, and thus the resin was cured. Thereafter, a cross session polisher (SM-09010 made by JEOL Ltd.) was used to cut the carrier core material. A cross section of the carrier core material was shot with a scanning electron microscope (JSM-6510LA type made by JEOL Ltd.).

Image analysis software (Image-Pro Plus made by Media Cybernetics, Inc.) was used to measure, from the shot image, the number and the area of internal air gaps having an air gap area of 20 μm$^2$ or more in 100 particles and to calculate a total air gap area of the internal air gaps having an area of 20 μm$^2$ or more, the resulting value was divided by a total particle area A (particle cross-sectional area including the internal air gaps) in 100 particles and thus the "internal porosity of the internal air gaps having an air gap area of 20 μm$^2$ or more" was calculated.

(Magnetic Property)

A room-temperature dedicated vibration sample type magnetometer (VSM) ("VSM-P7" made by Toei Industry Co., Ltd.) was used to apply an external magnetic field in a range of 0 to 79.58×10$^4$ A/m (10000 oersteds) continuously in one cycle, and thus a saturation magnetization $\sigma_s$, a magnetization $\sigma_{1k}$ and a residual magnetization $\sigma_r$ were measured.

(Electrical Resistance)

Two brass plates whose surfaces were electropolished and whose thicknesses were 2 mm were arranged as electrodes such that the distance between the electrodes was 2 mm, 200 mg of the carrier core material was inserted into an air gap between the two electrode plates, then a magnet having a cross-sectional area of 240 mm$^2$ was arranged behind each of the electrode plates, in a state where a bridge of powder to be measured was formed between the electrodes, direct-current voltages of 100 V, 500 V and 1000 V were applied between the electrodes and thus values of currents flowing through the carrier core material were measured by a four-terminal method, with the result that the electrical resistance of the carrier core material was calculated. In table 2, "B.D." means that the carrier core material caused a dielectric breakdown.

(Evaluation of Development Memory)

A carrier was produced by coating the surface of the obtained carrier core material with a resin. Specifically, 450 mass parts of silicone resin and 9 mass parts of (2-aminoethyl) aminopropyl trimethoxysilane were dissolved in 450 mass parts of toluene serving as a solvent, and thus a coat solution was produced. The coat solution was applied with a fluidized bed-type coating device to 50000 mass parts of the carrier core material and was heated with the electric furnace whose temperature was 300° C., and thus the carrier was obtained. Likewise, in all examples and comparative examples which will be described below, the carrier was obtained.

The obtained carrier and a toner whose average particle diameter was about 5.0 were mixed with a pot mill for a predetermined time, and thus a two-component electrophotographic developer was obtained. In this case, the carrier and the toner were adjusted such that mass of the toner/(masses of the toner and the carrier)=5/100. Likewise, in all examples and comparative examples which will be described below, the developer was obtained. The obtained developer was put into the development device of a structure shown in FIG. 1 (the peripheral speed Vs of a development sleeve: 406 mm/sec, the peripheral speed Vp of a photosensitive drum: 205 mm/sec and a photosensitive drum-to-development sleeve distance: 0.3 mm), an image in which a solid image part and a non-image part were adjacent to each other in the circumferential direction of the photosensitive drum and a halftone of a large area was continuous was acquired in the initial stage and after the formation of two hundred thousand sheets, the image densities of a region in the second revolution of the development roller where a solid image in the first revolution of the development roller was developed and the other region were measured with a reflection densitometer (model number TC-6D made by Tokyo Denshoku Co., Ltd.), a difference therebetween was determined and an evaluation was performed with the following criteria. The results are shown in table 2.

"Excellent": less than 0.003

"Good": equal to or greater than 0.003 and less than 0.006

"Fair": equal to or greater than 0.006 and less than 0.020

"Poor": equal to or greater than 0.020

(Carrier Adherence (Solid Image Part))

The two-component developer which was produced was put into the development device of the structure shown in FIG. 1 (the peripheral speed Vs of the development roller: 406 mm/sec, the peripheral speed Vp of the photosensitive drum: 205 mm/sec and a photosensitive drum-to-development roller distance: 0.3 mm), a solid image was formed on caused by the carrier adherence was evaluated with the following criteria. The results of the evaluation are shown in table 2.

"Excellent": no carrier adherence was found at all

"Good": carrier adherence was slightly found but there was no problem in actual use "Fair": carrier adherence was found and it was impossible to use the developer "Poor": carrier adherence was significantly found and it was impossible to use the developer at all

TABLE 1

| | Composition (mol %) | | | | | O.Bluntness | Iso Roundness | Apparent density | Fluidity | $D_{50}$ | Particle diameter of 26 μm or less |
|---|---|---|---|---|---|---|---|---|---|---|---|
| | $Fe_2O_3$ | MnO | MgO | SnO | SrO | D[4.3](%) | D[4.3](%) | (g/cm$^3$) | (sec./50 g) | μm | number % |
| Example 1 | 55.6 | 43.6 | — | 0.5 | 0.4 | 72.4 | 84.6 | 2.16 | 32 6 | 34.6 | 24 |
| Example 2 | 55.8 | 43.3 | — | 0.5 | 0.4 | 73.6 | 85.2 | 2.27 | 29.6 | 34.8 | 24 |
| Example 3 | 55.6 | 43.5 | — | 0.5 | 0.4 | 71.0 | 83.6 | 2 27 | 30.6 | 34.6 | 24 |
| Example 4 | 55.8 | 43.6 | — | 0.5 | 0.4 | 70.7 | 84.3 | 2.27 | 30.9 | 35.0 | 16 |
| Example 5 | 50.2 | 45.7 | — | 0.6 | 0.5 | 74.3 | 85.9 | 2.23 | 30.2 | 36.6 | 15 |
| Comparative example 1 | 55.6 | 44.4 | — | — | — | 86.1 | 89.0 | 2.43 | 26.0 | 34.4 | 24 |
| Comparative example 2 | 49.4 | 49.6 | — | — | 0.7 | 70.8 | 86.8 | 2.08 | 34.2 | 36.2 | 15 |
| Comparative example 3 | 50.3 | 37.8 | 11.2 | — | 0.7 | 83.0 | 86.9 | 2.09 | 42.2 | 36.9 | 19 |
| Comparative example 4 | 58.2 | 48.7 | — | 0.5 | 0.5 | 77.3 | 86.6 | 2.19 | 30.9 | 36.6 | 15 |

TABLE 2

| | Pore volume | Internal porosity | | | | σs | $\sigma_1k$ | σt | Development | Carrier adherence solid image |
|---|---|---|---|---|---|---|---|---|---|---|
| | | | | | | Electrical resistance (Ω) | | | | |
| | $cm^3/g$ | % | $Am^2/kg$ | $Am^2/kg$ | $Am^2/kg$ | 100 V | 500 V | 1000 V | memory | part |
| Example 1 | 0.007 | 2.9 | 83.4 | 69.8 | 0.5 | $8.0 \times 10^7$ | $1.1 \times 10^6$ | B.D. | Good | Good |
| Example 2 | 0 006 | 0.8 | 83.7 | 69.9 | 0.5 | $7.6 \times 10^7$ | $7.3 \times 10^5$ | B.D. | Good | Good |
| Example 3 | 0.004 | 0.7 | 83.6 | 70.7 | 0.5 | $1.1 \times 10^8$ | $1.2 \times 10^6$ | B.D. | Excellent | Good |
| Example 4 | 0.004 | 0.7 | 34.8 | 71.2 | 0.6 | $1.0 \times 10^8$ | $3.9 \times 10^5$ | B.D, | Good | Excellent |
| Example 1 | 0.007 | 2.6 | 78.6 | 63.2 | 0.6 | $9.1 \times 10^7$ | $6.2 \times 10^5$ | B.D. | Good | Excellent |
| Comparative example 1 | 0.002 | 0.4 | 81.7 | 69.1 | 0.5 | $1.2 \times 10^8$ | $4.1 \times 10^7$ | $8.7 \times 10^6$ | Good | Excellent |
| Comparative example 2 | 0.016 | 5.2 | 74.0 | 64.5 | 0.6 | $2.7 \times 10^7$ | $3.9 \times 10^5$ | B.D. | Bair | Excellent |
| Comparative example 3 | 0.014 | 4.5 | 70.3 | 63.3 | 0.7 | $7.3 \times 10^7$ | $3.9 \times 10^6$ | B.D. | Poor | Good |
| Comparative example 4 | 0.013 | 4.8 | 78.2 | 64.0 | 0.7 | $3.2 \times 10^7$ | $7.2 \times 10^5$ | B.D. | Fair | Excellent |

In the carrier core materials in examples 1 to 5 in which the volume moment means D [4, 3] of O. Bluntness and ISO Roundness were in the ranges specified in the present invention, the development memory was suppressed, and the carrier adherence in the solid image part was not confirmed or there was no problem in actual use.

By contrast, in the carrier core materials in comparative examples 1 and 3 in which the volume moment means D [4, 3] of O. Bluntness and ISO Roundness were higher than the ranges specified in the present invention, the carrier adherence in the solid image part was not confirmed or there was no problem in actual use but the development memory significantly occurred.

In the carrier core materials in comparative examples 2 and 4 in which the volume moment mean D [4, 3] of ISO Roundness was higher than the range specified in the present invention, the carrier adherence in the solid image part was not confirmed or there was no problem in actual use but the development memory occurred such that there was a problem in actual use.

INDUSTRIAL APPLICABILITY

The carrier core material according to the present invention is useful because even when the carrier core material is used in a high-speed image forming apparatus, it is possible to suppress the development memory and the carrier adherence.

The invention claimed is:

1. A carrier core material comprising ferrite particles, wherein a composition of the ferrite particle has the formula $M_XFe_{3-x}O_4$, wherein M is Mn and x is defined such that the composition contains 35 mole percent or more and 55 mole percent or less of MnO and 45 mole percent or more and 65 mole percent or less of $Fe_2O_3$, and part thereof is substituted for 0.1 mole percent or more and 1.0 mole percent or less of SrO and 0.1 mole percent or more and 1.0 mole percent or less of SnO, a volume moment mean D [4, 3] of O. Bluntness measured with an injection type image analysis particle size distribution meter is equal to or greater than 65% and equal to or less than 80%, and a volume moment mean D [4, 3] of ISO Roundness is equal to or greater than 80% and equal to or less than 86%.

2. The carrier core material according to claim 1, wherein a saturation magnetization $\sigma_S$ is equal to or greater than 75 $Am^2/kg$ and equal to or less than 88 $Am^2/kg$.

3. The carrier core material according to claim 1, wherein a pore volume is equal to or less than 0.01 $cm^3/g$.

4. An electrophotographic development carrier, wherein a surface of the carrier core material according to claim 1 is coated with a resin.

5. An electrophotographic developer comprising:

the electrophotographic development carrier according to claim 4; and a toner.

* * * * *